(12) United States Patent
Konno et al.

(10) Patent No.: US 12,165,359 B2
(45) Date of Patent: Dec. 10, 2024

(54) SPATIAL RECOGNITION SYSTEM, SPATIAL RECOGNITION DEVICE, SPATIAL RECOGNITION METHOD, AND PROGRAM

(71) Applicants: INFORMATIX INC., Kawasaki (JP); CHIYODA SOKKI CO., LTD., Tokyo (JP)

(72) Inventors: Koji Konno, Kawasaki (JP); Keitaro Hirano, Tokyo (JP); Yukio Hirahara, Tokyo (JP)

(73) Assignees: INFORMATIX INC., Kawasaki (JP); CHIYODA SOKKI CO., LTD., Tokyo (JP)

( * ) Notice: Subject to any disclaimer, the term of this patent is extended or adjusted under 35 U.S.C. 154(b) by 585 days.

(21) Appl. No.: 17/613,339

(22) PCT Filed: May 25, 2020

(86) PCT No.: PCT/JP2020/020628
§ 371 (c)(1),
(2) Date: May 27, 2022

(87) PCT Pub. No.: WO2020/235694
PCT Pub. Date: Nov. 26, 2020

(65) Prior Publication Data
US 2022/0301223 A1    Sep. 22, 2022

(30) Foreign Application Priority Data
May 23, 2019 (JP) .................... 2019-096601

(51) Int. Cl.
G06T 7/73      (2017.01)
(52) U.S. Cl.
CPC .................... G06T 7/75 (2017.01)

(58) Field of Classification Search
None
See application file for complete search history.

(56) References Cited

U.S. PATENT DOCUMENTS

| | | |
|---|---|---|
| 2014/0218361 A1 | 8/2014 | Abe et al. |
| 2020/0118336 A1 | 4/2020 | Oyanagi et al. |

(Continued)

FOREIGN PATENT DOCUMENTS

| | | |
|---|---|---|
| JP | 2000-155855 | 6/2000 |
| JP | 2005322022 A | * 11/2005 |

(Continued)

OTHER PUBLICATIONS

Kojima et al.,; "Multi-robot D-SLAM for Large Scale Map Building and Its Control Theoretical Analysis", Transactions of the Society of Instrument and Control Engineers, vol. 50, No. 3, 2014, (10 pages)++.

(Continued)

*Primary Examiner* — Delomia L Gilliard
(74) *Attorney, Agent, or Firm* — STAAS & HALSEY LLP (57) ABSTRACT

A spatial recognition device has a spatial recognition unit for generating spatial data by recognizing a three-dimensional shape in a real space, and a self-location estimating unit for estimating the self-location in real space. A spatial data unification unit unifies the spatial data and spatial data generated by another spatial recognition device to generate unified spatial data that is expressed in the same coordinate system having the same origin. A self-location sharing unit transmits the self-location based on the unified spatial data, to another spatial recognition device. The self-location sharing unit acquires the self-location from another spatial recognition device) when the self-location estimating unit cannot estimate the self-location.

7 Claims, 6 Drawing Sheets

(56) References Cited

U.S. PATENT DOCUMENTS

2020/0327333 A1* 10/2020 Kunitsu .................. G06F 3/011
2023/0120092 A1*  4/2023 Kobayashi ............. G06F 3/013
                                                    382/103

FOREIGN PATENT DOCUMENTS

| JP | 2011221631 A | * | 11/2011 |
| JP | 2014-149712 | | 8/2014 |
| JP | 6438995 | | 11/2018 |
| WO | WO 2018/194137 | | 10/2018 |

OTHER PUBLICATIONS

Japanese Office Action dated Nov. 18, 2021 from Japanese Application No. 2019-096601.
International Search Report dated Aug. 25, 2020 from International Application No. PCT/JP2020/020628.

* cited by examiner

FIG. 8

# SPATIAL RECOGNITION SYSTEM, SPATIAL RECOGNITION DEVICE, SPATIAL RECOGNITION METHOD, AND PROGRAM

CROSS-REFERENCE TO RELATED APPLICATIONS

This application is a U.S. National Stage Application which claims the benefit under 35 U.S.C. § 371 of International Patent Application No. PCT/JP2020/020628 filed on May 25, 2020, which claims foreign priority benefit under 35 U.S.C. § 119 of Japanese Patent Application No. 2019-096601 filed on May 23, 2019 in the Japanese Intellectual Property Office, the contents of both of which are incorporated herein by reference.

TECHNICAL FIELD

The present invention relates to a spatial recognition system, a spatial recognition device, and a spatial recognition method and program, and in particular to a technology for increasing the precision with locating estimation.

BACKGROUND ART

Devices for expressing specific functions by recognizing a wall, an obstacle, or the like that exists in a real spatial (hereinafter, referred to as spatial recognition devices) have been widely utilized in industrial circles. Examples include construction and detection operations for structures such as a tunnel, a bridge, a building, and the like where a worker who wears an HMD (head-mounted display) having a function of recognizing a real space by means of a camera or a depth sensor carries out an operation by freely moving around within the real space while visually recognizing an object such as a drawing that is reflected on a wall or a floor via a transparent display (see Patent Literature 1).

Such spatial recognition devices recognize the correct self-location within a real space in order to make it possible to express such a function as to project various objects including drawings in the correct location. Conventional spatial recognition devices have estimated their self-locations by utilizing a GNSS (global navigation satellite system) such as a GPS (global positioning system) or by finding as a reference the location of a marker that is placed within the real space.

In addition, Patent Literature 2 discloses a system for specifying the viewpoint of a worker by allowing a total station to follow a prism that is fixed to the hard hat of the worker so that a visual image can be displayed on the goggles of the worker in accordance with the viewpoint.

CITATION LIST

Patent Literature

Patent Literature 1: Japan Patent Number 6438995
Patent Literature 2: Japanese Patent Laid-Open No. 2000-155855

SUMMARY OF THE INVENTION

Technical Problem

Systems for utilizing a GNSS or the like have such a problem that it is difficult to utilize the system in a location where the navigation signal is interrupted such as in a building or within a tunnel. In addition, systems for using a marker as a reference have such a problem that the farther the spatial recognition device is away from the marker, the greater the error in the estimation of the current location becomes. Though the systems that use a total station as a reference as that in Patent Literature 2 can reduce an error as compared to the systems that use a marker as a reference, such a problem arises in which the location cannot be recognized when the spatial recognition device deviates from the visual field of the total station.

Furthermore, conventional spatial recognition devices have such a problem that an incidental failure in the estimation of the self-location, that is to say, the occurrence of a so-called loss, easily causes a problem in the process where the recognition of the self-location is indispensable, such as the projection of contents upon a real space.

The present invention is provided in order to solve such problems, and an object thereof is to provide a spatial recognition system, a spatial recognition device, and a spatial recognition method and program where it is possible to increase the precision with the estimation of the self-location and the stability.

Solution to Problem

In accordance with one aspect of the invention, a spatial recognition device is provided with: a spatial recognition unit for generating spatial data by recognizing a three-dimensional shape in a real space; a self-location estimating unit for estimating self-location in the real space on the basis of the spatial data; a spatial data unification unit for unifying the spatial data and spatial data that is generated by another spatial recognition device so as to generate unified spatial data that is expressed with the same coordinate system having the same origin; and a self-location sharing unit for transmitting the self-location in the real space that has been estimated on the basis of the unified spatial data to another spatial recognition device, wherein the self-location sharing unit acquires the self-location from another spatial recognition device when the self-location estimating unit cannot estimate the self-location.

In accordance with another aspect of the invention, a spatial recognition system is provide with a first spatial recognition device and a second spatial recognition device, wherein the first spatial recognition device has: a first spatial recognition unit for generating first spatial data by recognizing a three-dimensional shape in a real space; a first self-location estimating unit for estimating a first self-location in the real space on the basis of the first spatial data; a first spatial data unification unit for transmitting the first spatial data to the second spatial recognition device; and a first self-location sharing unit for transmitting the first self-location to the second spatial recognition device, and the second spatial recognition device has: a second spatial recognition unit for generating second spatial data by recognizing a three-dimensional shape in the real space; a second self-location estimating unit for estimating a second self-location in the real space on the basis of the second spatial data; a second spatial data unification unit for unifying the first spatial data and the second spatial data so as to generate unified spatial data that is expressed in the same coordinate system having the same origin; and a second self-location sharing unit for transmitting the second self-location in the real space that has been estimated on the basis of the unified spatial data to the first spatial recognition device, and the second self-location sharing unit acquires the second self-location from the first spatial recognition device when the second self-location estimating unit cannot estimate the self-location in the real space.

In accordance with still another aspect of the invention, a spatial recognition system is provided with a plurality of spatial recognition devices and a server, wherein a spatial recognition device has: a spatial recognition unit for generating spatial data by recognizing a three-dimensional shape in a real space; and a self-location estimating unit for estimating the self-location in the real space on the basis of the spatial data, and the server has: a spatial data unification unit for unifying spatial data that has been generated by the plurality of spatial recognition devices so as to generate unified spatial data that is expressed in the same coordinate system having the same origin; and a self-location sharing unit for transmitting the self-location of a spatial recognition device in the real space that has been estimated on the basis of the unified spatial data to another spatial recognition device, and the self-location sharing unit acquires the self-location from another spatial recognition device when the self-location estimating unit cannot estimate the self-location.

In accordance with yet another aspect of the invention, a spatial recognition system is provided with a first spatial recognition device and a second spatial recognition device, wherein the first spatial recognition device has: a first spatial recognition unit for generating first spatial data by recognizing a three-dimensional shape in a real space; a first self-location estimating unit for estimating the first self-location in the real space on the basis of the first spatial data; a first spatial data unification unit for transmitting the first spatial data to the second spatial recognition device; and a first self-location sharing unit for transmitting the first self-location to the second spatial recognition device, and the second spatial recognition device has: a second spatial recognition unit for generating second spatial data by recognizing a three-dimensional shape in a real space; a second self-location estimating unit for estimating the second self-location in the real space on the basis of the second spatial data; a second spatial data unification unit for unifying the first spatial data and the second spatial data so as to generate unified spatial data that is expressed in the same coordinate system having the same origin; and a second self-location sharing unit for transmitting the second self-location in the real space that has been estimated on the basis of the unified spatial data to the first spatial recognition device, and the first spatial recognition or the second spatial recognition device further has a self-location correcting unit, and the self-location correcting unit corrects the first self-location or the second self-location that has been estimated by the first self-location estimating unit or the second self-location estimating unit on the basis of location information on the first spatial recognition device or the second spatial recognition device that has been measured by a total station.

In accordance with yet still another aspect of the invention, the spatial recognition system is provided in such a manner where the first self-location estimating unit estimates the self-location by using local coordinates.

In accordance with another aspect of the invention, a spatial recognition method is provided with: a spatial recognition step of allowing a spatial recognition device to generate spatial data by recognizing a three-dimensional shape in a real space; a self-location estimating step of estimating self-location in the real space on the basis of the spatial data; a spatial data unification step of unifying the spatial data and spatial data that is generated by another spatial recognition device so as to generate unified spatial data that is expressed in the same coordinate system having the same origin; and a self-location sharing step of transmitting the self-location in the real space that has been estimated on the basis of the unified spatial data to another spatial recognition device, wherein in the self-location sharing step, the self-location is acquired from another spatial recognition device when the self-location estimating unit cannot estimate the self-location.

In accordance with still another aspect of the invention, a program is provided in order to allow a computer to implement the above-described method.

Advantageous Effects of the Invention

The present invention can provide a spatial recognition system, a spatial recognition device, and a spatial recognition method and program where it is possible to increase the precision with the estimation of the self-location and the stability.

DESCRIPTION OF EMBODIMENTS

First Embodiment

Figure 1:
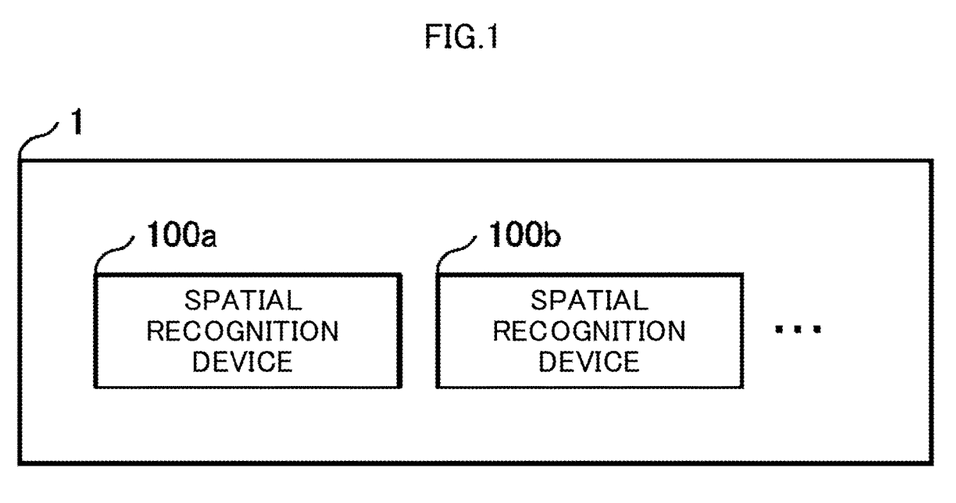
FIG. 1 is a block diagram showing the configuration of the spatial recognition system 1 according to the first embodiment.

An embodiment of the present invention is described in reference to the drawings. First, the configuration of the spatial recognition system 1 according to the first embodiment of the present invention is described in reference to FIG. 1. The spatial recognition system 1 includes a plurality of spatial recognition devices 100 (100a, 100b, . . . ).

Figure 2:
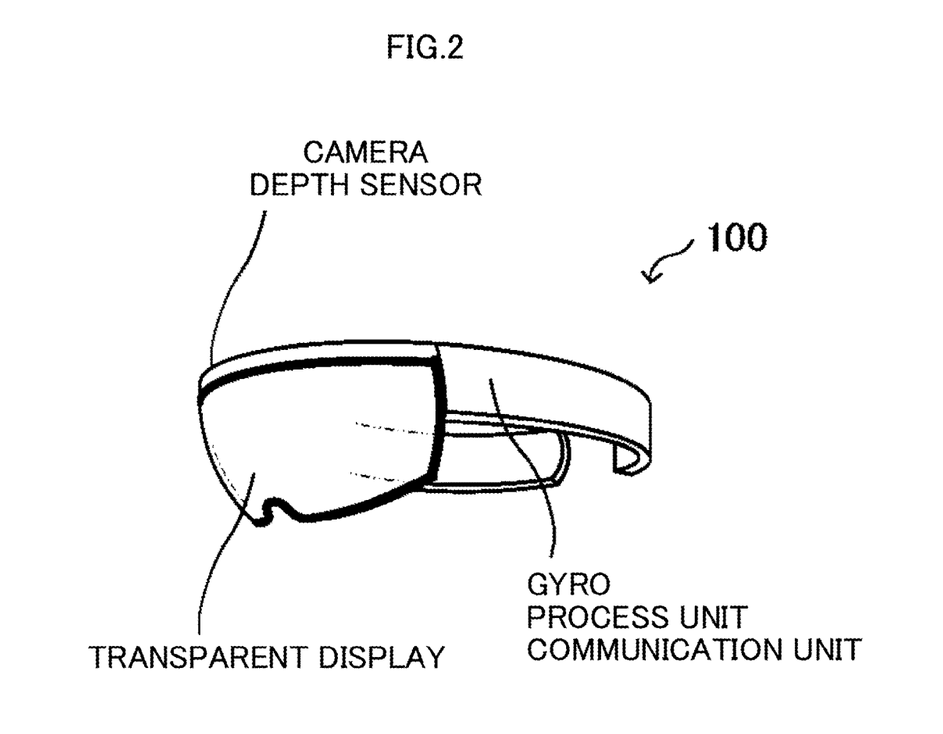
FIG. 2 is a diagram showing an example of the appearance of the spatial recognition device 100 according to the first embodiment.

FIG. 2 is a diagram showing an example of the appearance of the spatial recognition device 100 according to the first embodiment. The spatial recognition device 100 is typically an HMD (head-mounted display) having a camera, a depth sensor, a gyro, a transparent display, a processing unit, and a communication unit, and examples thereof include Hololens (registered trademark).

The camera continuously takes images of a real space so as to acquire image data. The spatial recognition device 100 performs on the basis of these pieces of image data recognition of a three-dimensional shape in the real space (mapping) and estimation of the location and position of the spatial recognition device 100 (self-location estimation) (SLAM: simultaneous localization and mapping). The SLAM is a publicly-known technology, and therefore, the present description does not describe a concrete algorithm of the SLAM. Here, it is possible for the spatial recognition device 100 to increase the precision with the SLAM by using the information that can be gained from the depth sensor for acquiring depth information of the real space and from the gyro for detecting the inclination of the spatial recognition device 100.

The transparent display is a display having a high level of transparency to such an extent that the real space on the opposite side of the display can be visually recognized, and thus can allow the user to visually recognize the contents that are reflected on the display in such a manner that the contents overlap the real space.

The processing unit includes at least a processor and a memory. When the processor runs the program stored in the memory, functions that are specific to the spatial recognition device 100 are implemented. The communication unit carries out transmission and reception of data to and from an external information processing device (a server, another spatial recognition device 100, or the like).

Figure 3:
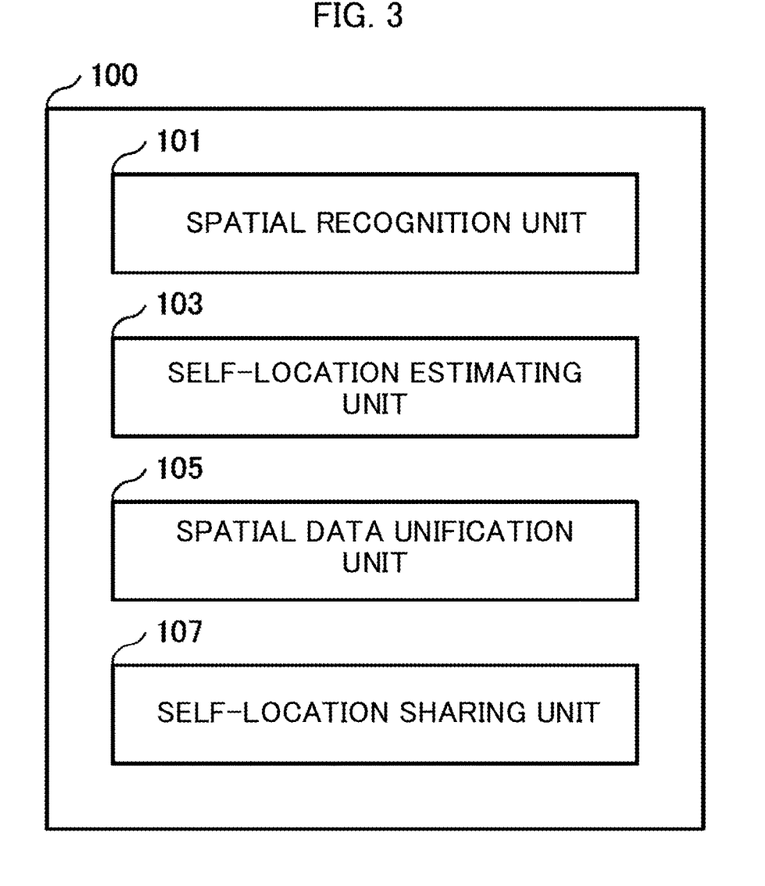
FIG. 3 is a block diagram showing functions of the spatial recognition device 100 according to the first embodiment.

FIG. 3 is a block diagram showing functions of the spatial recognition device 100 according to the first embodiment. The spatial recognition device 100 has a spatial recognition unit 101, a self-location estimating unit 103, a spatial data unification unit 105, and a self-location sharing unit 107.

The spatial recognition unit 101 carries out mapping on the basis of the information gained from the camera, the depth sensor, the gyro, and the like. As a result of the mapping, the spatial recognition unit 101 generates three-dimensional mesh data or three-dimensional dot group data (hereinafter, referred to as spatial data). The three-dimensional mesh data is a set of a great number of small planes (mesh) showing a three-dimensional shape in the real space. Typically, each mesh is represented by the normal vector thereof, and therefore, the mesh data can be a set of normal vectors. The three-dimensional dot group data is a set of a great number of dots showing a three-dimensional shape in the real space (dot group). Concretely, it is a set of respective points in three-dimensional coordinates.

The self-location estimating unit 103 carries out estimation of the location and position of the spatial recognition device 100 (self-location estimation) on the basis of the information gained from the camera, the depth sensor, the gyro, and the like. As a result of the self-location estimation, the self-location estimating unit 103 typically calculates the coordinates of the location of the camera and the inclination of the spatial recognition device 100.

The spatial data unification unit 105 carries out communication with other spatial recognition units 100 that exist within the real space, and unifies the spatial data from the plurality of spatial recognition devices 100. As an example, a case is assumed where a spatial recognition device 100a and a spatial recognition device 100b exist within the real space. The spatial recognition device 100a that works as a parent unit transmits the spatial data Sa that has been recognized by itself (the spatial recognition device 100a) to the spatial recognition device 100b that works as a child unit. The spatial recognition device 100b that works as a child unit carries out pattern matching between the spatial data Sa that has been recognized by the spatial recognition device 100a and the spatial data Sb that has been recognized by itself (the spatial recognition device 100b) so as to generate the unified spatial data Si, where the spatial data recognized by the two is unified.

Pattern matching between spatial data is described below. In the case where the spatial data is three-dimensional mesh data, the spatial data unification unit 105 on the child unit (spatial recognition device 100b) side searches for a mesh where the shape, the inclination, and the size are the same (including the one where they are completely the same and the one where the differences are within a predetermined threshold value) from among the meshes of the two sides of the spatial recognition device 100a and the spatial recognition device 100b. The same shape, inclination, and size of the mesh means, in other words, a high similarity of the normal vector. When a pair of the same meshes is found, these meshes are made to overlap each other so as to combine the two meshes and generate one unified piece of three-dimensional mesh data. In the case where the spatial data is three-dimensional dot group data, the same can be applied, and the spatial data unification unit 105 on the child unit (spatial recognition device 100b) side selects dots of which the similarity is high respectively from the spatial data of the two sides and overlaps these dots with each other in order to combine the two meshes, and thus generates one unified piece of three-dimensional mesh data.

The spatial data unification unit 105 of the spatial recognition device 100b that is a child unit transmits the unified spatial data Si that has been generated to the spatial data unification unit 105 of the spatial recognition device 100a that is a parent unit. As a result, the unified spatial data Si is shared between the spatial recognition device 100a and the spatial recognition device 100b. After that, the spatial recognition device 100a and the spatial recognition device 100b use the unified spatial data Si in order to recognize their own locations. That is to say, the same world coordinates are shared, and their self-locations are expressed as relative coordinates from the origin of the world coordinates.

Here, an example where there is one child unit is shown; however, the present invention is not limited to this, and there may be a plurality of child units. In this case, the above-described series of processes are carried out on each of the child units.

The self-location sharing unit 107 transmits the self-location to the other spatial recognition devices 100 that exist within the real space at predetermined intervals. In the case where a spatial recognition device 100a and a spatial recognition device 100b exist within the real space, for example, the spatial recognition device 100a transmits its own location (self-location) Pa to the spatial recognition device 100b, and the spatial recognition device 100b keeps Pa for a certain period of time. Likewise, the spatial recognition device 100b transmits its own location (self-location) Pb to the spatial recognition device 100a, and the spatial recognition device 100a keeps Pb for a certain period of time. Here, the self-locations Pa and Pb are expressed in the same coordinate system having the same origin as a result of the spatial data unifying process by means of the spatial data unification unit 105. Therefore, the spatial recognition device 100a and the spatial recognition device 100b can share the coordinates that show the location where the counterpart exists.

Incidentally, the spatial recognition device 100 may fail the estimation of the self-location due to the stagnation of the SLAM process, and thus sometimes losses the self-location temporarily. This is referred to as a loss. The loss is a great factor of lowering the precision with locating estimation by the spatial recognition device 100. Therefore, a mechanism for allowing another spatial recognition device 100 to teach its own location in the case where a loss occurs is introduced to the present embodiment in order to suppress the reduction in the precision with the locating estimation due to a loss. Upon the detection of the occurrence of a loss, the self-location sharing unit 107 transmits a loss signal to another spatial recognition device 100 that exists within the real space. The self-location sharing unit 107 in the other spatial recognition device 100 that has received the loss signal notifies the spatial recognition device 100 that has been lost of the location where it exists.

For example, a case is assumed where a spatial recognition device 100a and a spatial recognition device 100b exist within a real space and a loss has occurred in the spatial recognition device 100a. The self-location sharing unit 107 in the spatial recognition device 100a transmits a loss signal to the self-location sharing unit 107 in the spatial recognition device 100b. The self-location sharing unit 107 in the spatial recognition device 100b transmits the newest self-location Pa from among the self-locations that had been shared with the spatial recognition device 100a in advance to the self-location sharing unit 107 in the spatial recognition device 100a. The self-location sharing unit 107 in the spatial recognition device 100a regards the received Pa as the self-location. As a result, it becomes possible for the spatial recognition device 100a to continue carrying out the process such as the projection of contents without interruption even in the case where a loss has occurred.

Here, the self-locations Pa and Pb can include information that indicates not only the locations of the spatial recognition devices 100, but also the positioning thereof. Here, an example where two spatial recognition devices 100 exist within a real space is shown; however, the present invention is not limited to this, and the number of spatial recognition devices may be any as long as the number is plural. The greater the number of spatial recognition devices 100 is, the higher the precision with the estimation of the locations of the spatial recognition devices 100 can be stabilized.

In accordance with the present embodiment, a plurality of spatial recognition devices 100 that exist within a real space unify spatial data before estimating the self-locations. As a result, self-location estimation can be carried out with high precision, even in the case where the navigating signal is interrupted in such a location as in a building or within a tunnel, or even in the case where a certain spatial recognition device 100 is located away from the marker. For example, even in the case where the spatial recognition device 100b is far away from the marker and cannot maintain the precision with the self-location estimation by itself, the spatial recognition device 100b can unify spatial data with the spatial recognition device 100a that is located close to the marker so as to be able to estimate the self-location with high precision, and thereby can carry out self-location estimation with the same level of precision as the spatial recognition device 100a.

In addition, in the present embodiment, a plurality of spatial recognition devices 100 share the self-locations and continue estimating the self-location through complementation at the time when a loss has occurred. As a result, it is possible to carry out self-location estimation more stably than the prior art.

Second Embodiment

In the first embodiment, the spatial recognition devices 100 that correspond to child units carry out a spatial data unifying process. Conversely, in the second embodiment, the server 200 carries out spatial data unifying and data sharing processes.

Figure 4:
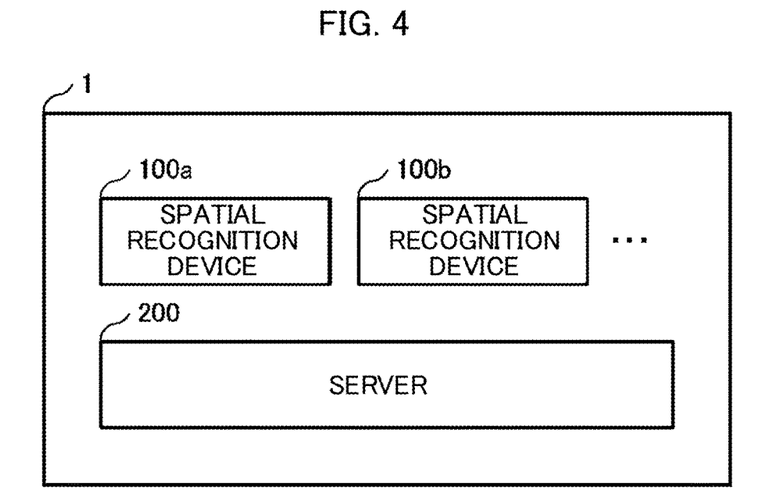
FIG. 4 is a block diagram showing the configuration of the spatial recognition system 1 according to the second embodiment.

FIG. 4 is a block diagram showing the configuration of the spatial recognition system 1 according to the second embodiment. The spatial recognition system 1 includes a plurality of spatial recognition devices 100 (100a, 100b, . . . ) and a server 200. The server 200 includes at least a processor and a memory and implements predetermined functions by allowing the processor to run a program that is stored in the memory.

Figure 5:
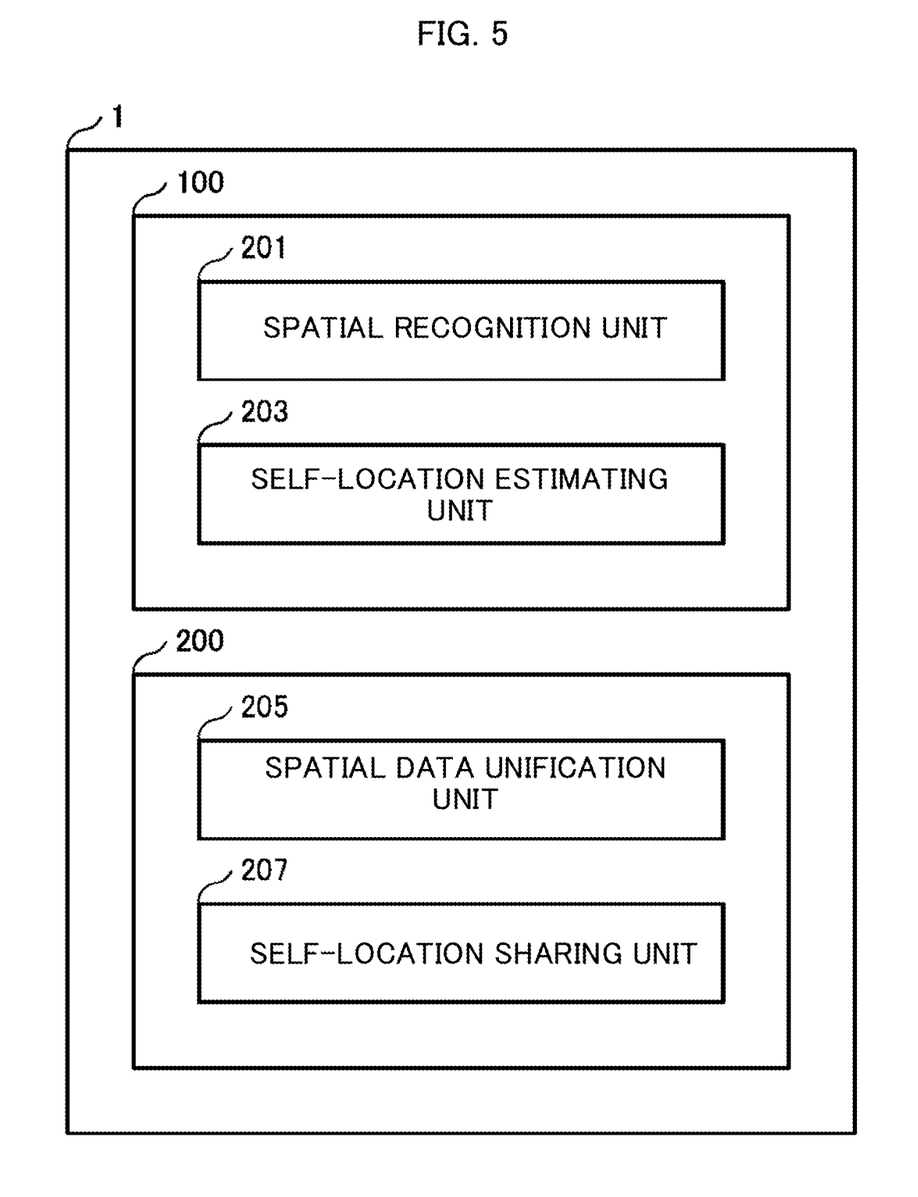
FIG. 5 is a block diagram showing functions of the spatial recognition system 1 according to the second embodiment.

FIG. 5 is a block diagram showing the functions of the spatial recognition system 1 according to the second embodiment. A spatial recognition device 100 has a spatial recognition unit 201 for recognizing a three-dimensional shape in a real space (mapping) and a self-location estimating unit 203 for estimating the location and position (self-location estimation). The server 200 has a spatial data unification unit 205 for unifying spatial data of the plurality of spatial recognition devices 100, and a self-location sharing unit 207 for sharing the locations where the spatial recognition units 100 exist for the recovery at the time when a loss occurs. The operations of the spatial recognition unit 201, the self-location estimating unit 203, the spatial data unification unit 205, and the self-location sharing unit 207 are described below excluding the same descriptions concerning the same points with the spatial recognition unit 101, the self-location estimating unit 103, the spatial data unification unit 105, and the self-location sharing unit 107 in the first embodiment.

The spatial recognition unit 201 transmits the generated spatial data to the spatial data unification unit 205 in the server 200. The spatial data unification unit 205 in the server 200 unifies the spatial data that has been received from the plurality of spatial recognition devices 100 so as to generate the unified spatial data. In addition, the spatial recognition unit 201 determines the origin Oi of the unified spatial data (typically uses the origin of an arbitrary parent unit) and transmits the determined origin to the spatial recognition unit 201 in each spatial recognition device 100. The spatial recognition unit 201 sets the origin Oi of the unified spatial data as the origin of itself. As a result, the coordinate system of each spatial recognition device 100 is unified.

The self-location estimating unit 203 transmits the self-location to the self-location sharing unit 207 in the server 200 at predetermined intervals. In the case where a loss has been detected, a loss signal is transmitted to the self-location sharing unit 207 in the server 200. Upon the reception of the lost signal, the self-location sharing unit 207 in the server 200 notifies the self-location estimating unit 203 of the self-location that has been shared with the spatial recognition device 100 directly before the reception of the lost signal. The self-location estimating unit 203 uses the notified self-location so as to continue the process, such as contents projection.

In the present embodiment, the server 200, which is often relatively blessed with process resources, carries out spatial data unifying and data sharing processes so that the burden of the processes in the spatial recognition devices 100 can be reduced, and thus, the throughput of the entire system can be increased.

Third Embodiment

In accordance with the first and second embodiments, a plurality of spatial recognition devices 100 can be made to cooperate with each other in order to prevent the precision with the self-location estimation of some spatial recognition devices 100 and the stability from lowering, even in such a situation where the lowering could occur in the prior art. In the case where all the spatial recognition devices 100 are far away from the marker, however, there is a risk of errors accumulating, which could lower the precision with the self-location estimation of the entire system. Therefore, in the third embodiment, a total station 300 is introduced in order to follow one spatial recognition device 100 from among the plurality of spatial recognition devices 100 and grasp the precise location, and thereby, the precision with the self-location estimation of the entire system can be maintained and increased.

Figure 6:
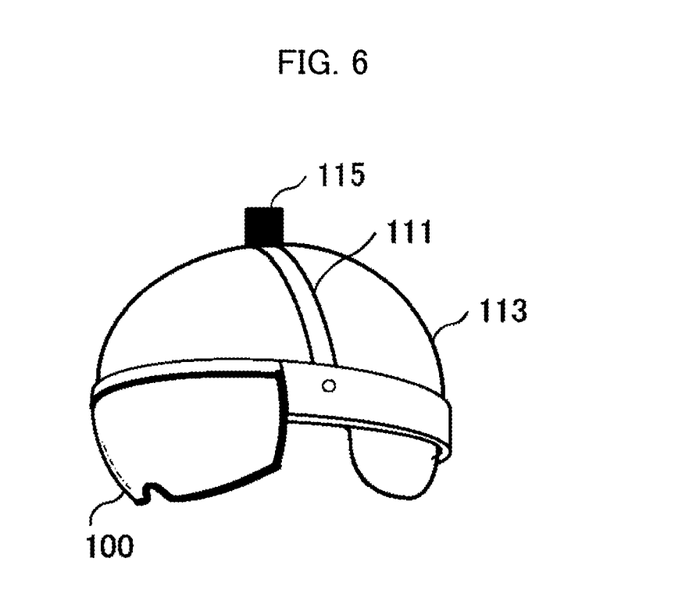
FIG. 6 is a diagram showing an example of the appearance of the spatial recognition device 100 according to the third embodiment.

FIG. 6 is a diagram showing an example of the appearance of the spatial recognition device 100 according to the third embodiment. In the present embodiment, the spatial recognition device 100 is fixed to a hard hat 113 by means of a jig 111. In addition, a prism 115 is attached to the jig 111. It is necessary for the positional relationships between the jig 111, the spatial recognition device 100, and the prism 115 to be fixed.

Figure 7:
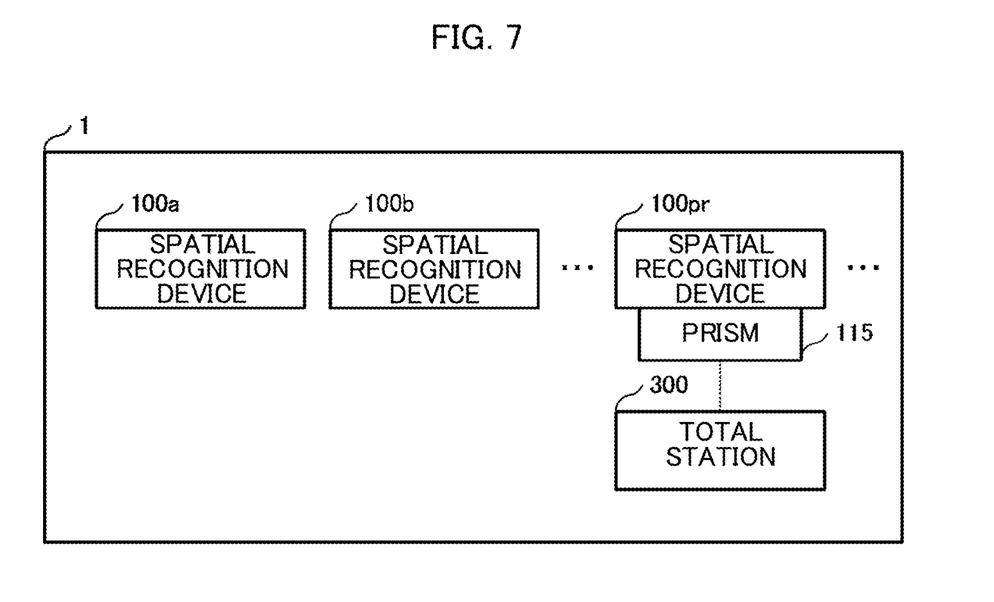
FIG. 7 is a block diagram showing the configuration of the spatial recognition system 1 according to the third embodiment.

FIG. 7 is a block diagram showing the configuration of the spatial recognition system 1 according to the third embodiment. The spatial recognition system 1 includes a plurality of spatial recognition devices 100 (100a, 100b, . . . ) and a total station 300. It is necessary for at least one spatial recognition device 100 from among the plurality of spatial recognition devices 100 to have the prism 115 being connected thereto as shown in FIG. 6. In the following, the spatial recognition device 100 to which the prism 115 is connected is referred to as spatial recognition device 100pr.

Figure 8:
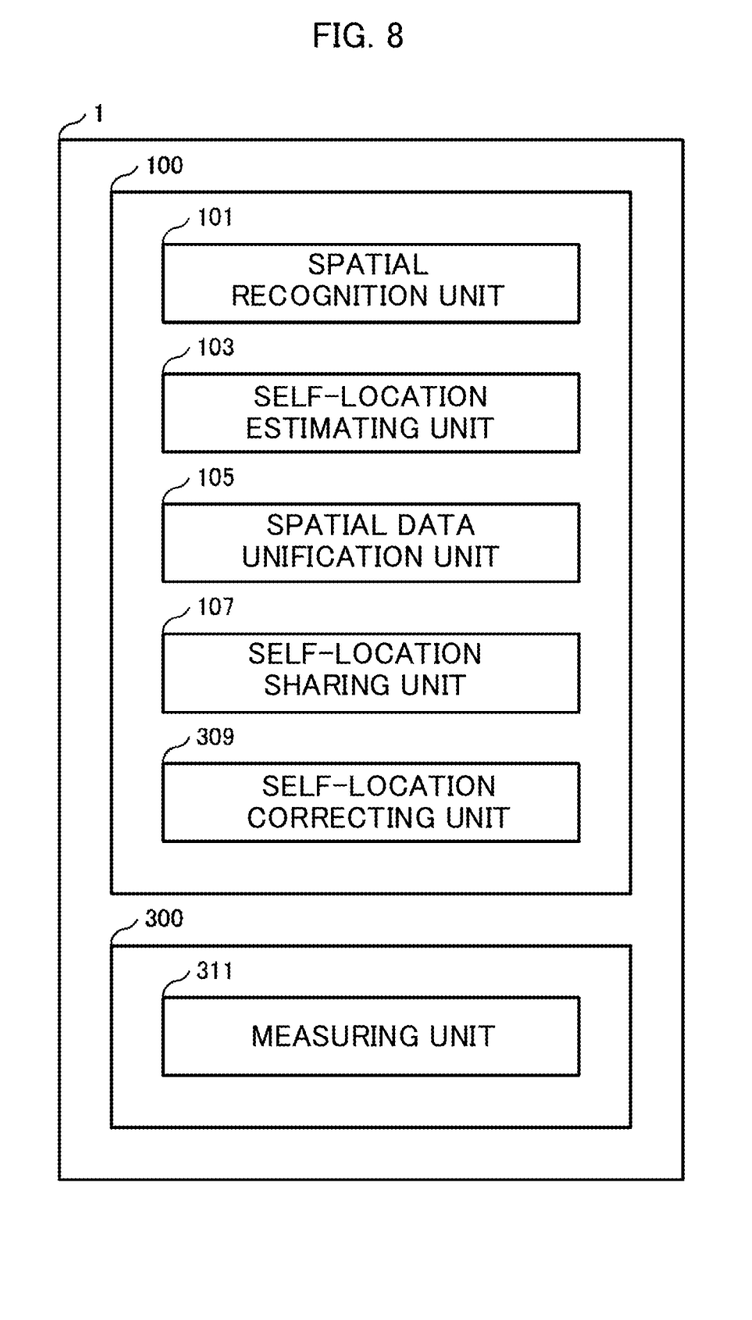
FIG. 8 is a block diagram showing functions of the spatial recognition system 1 according to the third embodiment.

FIG. 8 is a block diagram showing the functions of the spatial recognition system 1 according to the third embodiment. A spatial recognition device 100 has, as constituent elements that are similar to those in the first embodiment, a space recognition unit 101 for recognizing a three-dimensional shape in a real space (mapping), a self-location estimating unit 103 for estimating the location and position (self-location estimation) by means of a SLAM, a spatial data unification unit 105 for unifying spatial data of the plurality of spatial recognition devices 100, and a self-location sharing unit 107 for sharing the locations where a plurality of spatial recognition devices 100 exists for the recovery at the time when a loss has occurred. In addition to these, the spatial recognition device 100 pr has a self-location correcting unit 309 for updating the self-location on the basis of the location information gained from the total station 300. The total station 300 has a measuring unit 311 for measuring the location of the prism 115 that is connected to the spatial recognition device 100pr. In the following, the operation that is specific to the spatial recognition devices 100 according to the third embodiment is described by focusing on the functions of the measuring unit 311 and the self-location correcting unit 309, which are constituent elements that are characteristics of the present embodiment.

First, the location of the prism 115 when the spatial recognition device 100pr is located at the origin is measured by the measuring unit 311 in the total station 300 for calibration. The measured value at this time is defined as (0, 0, 0) on the total station 300 side, and thereby, the coordinate system is made the same between the spatial recognition device 100pr and the total station 300.

In the following, the measuring unit 311 in the total station 300 measures the location of the prism 115 at any time as required. The measuring unit 311 transmits the measured value to the self-location correcting unit 309 in the spatial recognition device 100pr. The measured value may be directly transmitted to the self-location correcting unit 309 from the measuring unit 311 or may be transmitted via the server or the like. Upon the reception of the measured value from the measuring unit 311, the self-location correcting unit 309 may simply overwrite the self-location estimating value that has been calculated by the self-location estimating unit 103 by means of the SLAM with this measured value. Alternatively, the self-location estimating value that has been calculated by means of the SLAM may be corrected by using this measured value. In the case where an error between the self-location estimating value that has been calculated by means of the SLAM and the measured value that has been received from the measuring unit 311 exceeds a predetermined threshold value, for example, a correction for canceling this error can be carried out on the self-location estimating value.

Here, all the spatial recognition devices 100 that have been described so far recognize the self-location with world coordinates. The same can be applied to the spatial recognition device 100pr and the spatial recognition devices 100 according to the first and second embodiments. Any of the spatial recognition devices 100 recognizes the self-location with relative coordinates having the origin that is defined within the real world that has been recognized.

However, the world coordinates themselves that are recognized by the spatial recognition devices 100 may include a shift due to the precision with the space recognition by the spatial recognition devices 100. Therefore, there is a limit in the precision with the estimation of the self-location as long as the self-location is expressed by using the world coordinates. As described above, the amount of movement of a spatial recognition device 100 can be measured relatively precisely by using a total station. However, the error in the recognition of the origin in the world coordinates system in a spatial recognition device 100 cannot be reduced.

Therefore, a modification of the third embodiment is provided in such a manner that the spatial recognition device 100pr can estimate the self-location by using local coordinates. As long as it is possible for the total station 300 to follow, the spatial recognition device 100pr updates the local coordinates by using the amount of movement that has been gained from the total station 300 without utilizing the SLAM. At the point in time when the total station 300 cannot capture the prism 115, the spatial recognition device 100pr switches the estimation to the self-location (local coordinate) estimation by means of the SLAM. Here, the local coordinates mean, in other words, the self-location in the coordinate system such as a drawing that is projected in the real space by the spatial recognition device 100pr. The self-location can be estimated with high precision by using the local coordinates on the basis of the amount of movement of the spatial recognition devices 100 with a small error without depending on the precision with the recognition of the origin in the world coordinate system.

In order to share the self-location with another spatial recognition device 100, the sharing may be carried out after converting the local coordinates to the world coordinates on the basis of the already-known offset between the origin in the local coordinate system and the origin in the world coordinate system.

Figure 9:
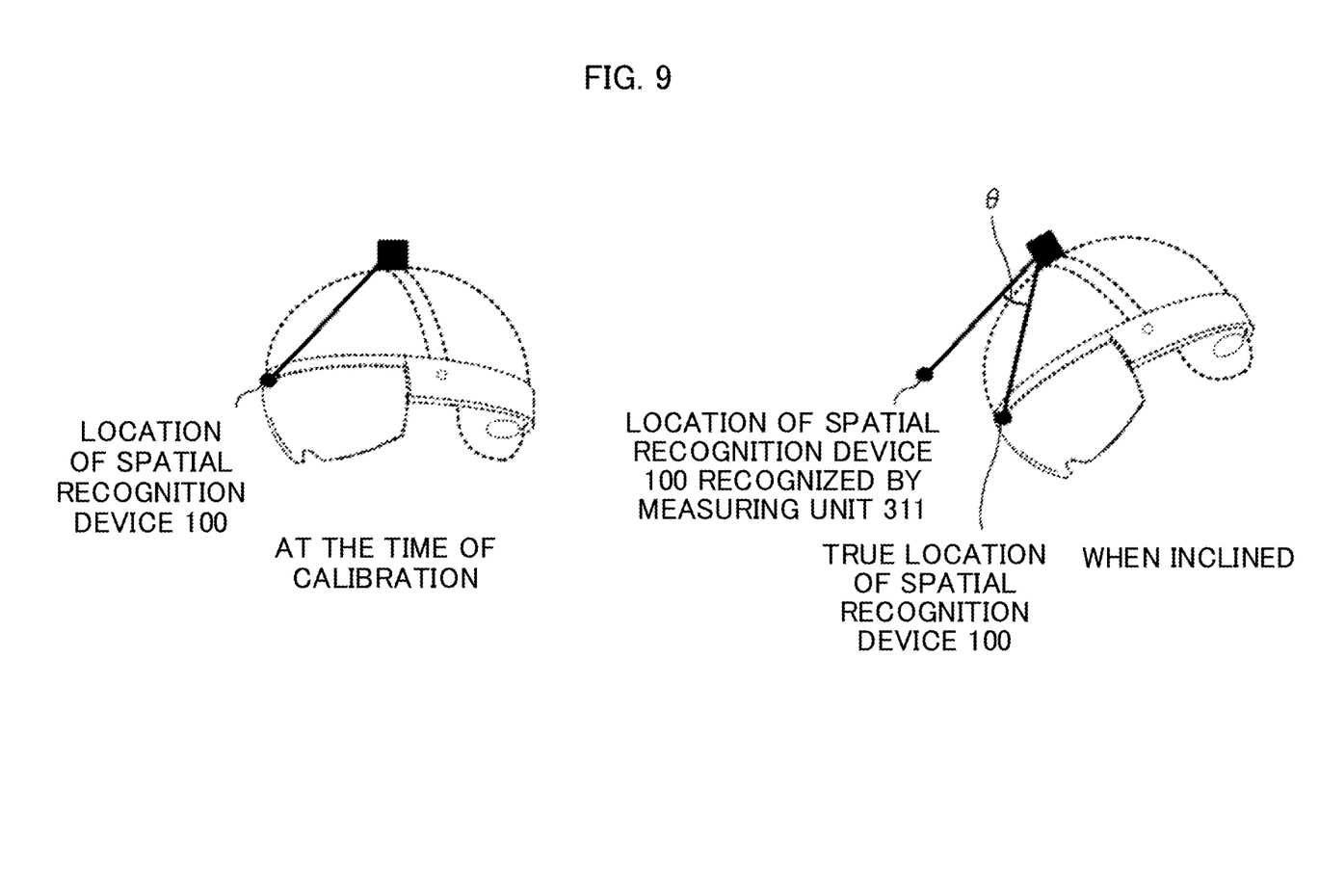
FIG. 9 is a diagram illustrating the process for correcting the measurement value by means of the self-location correction unit 309.

Here, the self-location correcting unit 309 may add correction to the measured value that has been received from the measuring unit 311, taking into consideration the offset between the spatial recognition device 100pr and the prism 115. The correction is not necessary in the case where the relative positional relationship between the spatial recognition device 100pr and the prism 115 is always the same as that at the point in time of the calibration; however, the measured value by means of the measuring unit 311 differs from the actual location of the spatial recognition device 100pr when the head is inclined, that is to say, the position of the spatial recognition device 100pr differs from that at the time of calibration, for example (see FIG. 9). The self-location correcting unit 309 can correct this error by utilizing the inclination θ of the spatial recognition device 100pr that is detected by the gyro.

In the present embodiment, the self-location correcting unit 309 always (or under predetermined conditions) corrects the self-location estimating value that has been calculated by the SLAM by using the measured value from the total station 300, and therefore, the spatial recognition device 100pr can always recognize the self-location with high precision. In addition, this spatial recognition device 100pr can be allowed to participate in the spatial recognition system 1 so as to unify the spatial data with the other spatial recognition devices 100, and thus, it becomes possible to increase the precision with the self-location estimation of the entire system.

Here, the present invention is not limited to the above-described embodiments, and appropriate modifications are possible as long as the gist of the invention is not deviated from. For example, the method for equipping various types of process means shown in the above embodiments as software or hardware is merely an example and may be substituted with other techniques. For example, the plurality of process means that is equipped within the same housing in the embodiments can be provided as a plurality of different pieces of hardware. Alternatively, the plurality of process means that is equipped in different pieces of hardware in the embodiments can be equipped in one piece of hardware. Furthermore, any of the process means or some functions of the process means may be implemented by using a technology such as cloud computing, edge computing, fog computing or the like.

Moreover, the above-described techniques shown in the first through third embodiments can be implemented by combining with each other in an arbitrary form as long as the gist of the present invention is not deviated from.

In addition, each process means that forms the present invention may be formed of hardware or may be implemented by allowing a CPU to run a computer program for an arbitrary process. Furthermore, the computer program can be stored in various types of computer readable media temporarily or not temporarily so as to be supplied to a computer. A temporary computer readable media includes an electromagnetic signal that can be supplied to a computer with wire or wirelessly, for example.

This application claims priority on the basis of Japanese Patent Application 2019-096601 filed on May 23, 2019, and the entirety of the disclosure thereof is incorporated herein.

REFERENCE SIGNS LIST

1 Spatial recognition system
100 (100a, 100b, 100pr) Spatial recognition device
101 Spatial recognition unit
103 Self-location estimating unit
105 Spatial data unification unit
107 Self-location sharing unit
111 Jig
113 Hard hat
115 Prism
200 Server
201 Spatial recognition unit
203 Self-location estimating unit
205 Spatial data unification unit
207 Self-location sharing unit
300 Total station
309 Self-location correcting unit
311 Measuring unit

The invention claimed is:

1. A spatial recognition device, comprising:
a spatial recognition unit for generating spatial data by recognizing a three-dimensional shape in a real space;
a self-location estimating unit for estimating self-location in the real space on the basis of the spatial data;
a spatial data unification unit for unifying said spatial data and spatial data that is generated by another spatial recognition device so as to generate unified spatial data that is expressed with the same coordinate system having the same origin; and
a self-location sharing unit for transmitting the self-location in the real space that has been estimated on the basis of the unified spatial data to another spatial recognition device, wherein
the self-location sharing unit acquires the self-location from another spatial recognition device when the self-location estimating unit cannot estimate the self-location.

2. A spatial recognition system, comprising a first spatial recognition device and a second spatial recognition device, wherein
the first spatial recognition device comprises:
a first spatial recognition unit for generating first spatial data by recognizing a three-dimensional shape in a real space;
a first self-location estimating unit for estimating a first self-location in the real space on the basis of the first spatial data;
a first spatial data unification unit for transmitting the first spatial data to the second spatial recognition device; and
a first self-location sharing unit for transmitting the first self-location to the second spatial recognition device, and
the second spatial recognition device comprises:
a second spatial recognition unit for generating second spatial data by recognizing a three-dimensional shape in the real space;
a second self-location estimating unit for estimating a second self-location in the real spatial on the basis of the second spatial data;
a second spatial data unification unit for unifying the first spatial data and the second spatial data so as to generate unified spatial data that is expressed in the same coordinate system having the same origin; and
a second self-location sharing unit for transmitting the second self-location in the real space that has been estimated on the basis of the unified spatial data to the first spatial recognition device, and
the second self-location sharing unit acquires the second self-location from the first spatial recognition device when the second self-location estimating unit cannot estimate the self-location in the real space.

3. The spatial recognition system according to claim 2, wherein the first self-location estimating unit estimates the self-location by using local coordinates.

4. A spatial recognition system, comprising:
a plurality of spatial recognition devices; and
a server, wherein each of the plurality of spatial recognition device comprises:
  a spatial recognition unit for generating spatial data by recognizing a three-dimensional shape in a real space; and
  a self-location estimating unit for estimating the self-location in the real space on the basis of the spatial data, and
the server comprises:
  a spatial data unification unit for unifying spatial data that has been generated by the plurality of spatial recognition devices so as to generate unified spatial data that is expressed in the same coordinate system having the same origin; and
  a self-location sharing unit for transmitting the self-location of a spatial recognition device in the real space that has been estimated on the basis of the unified spatial data to another spatial recognition device, and
  the self-location sharing unit acquires the self-location from another spatial recognition device when the self-location estimating unit cannot estimate the self-location.

5. A spatial recognition system, comprising:
a first spatial recognition device; and
a second spatial recognition device, wherein
  the first spatial recognition device comprises:
    a first spatial recognition unit for generating first spatial data by recognizing a three-dimensional shape in a real space;
    a first self-location estimating unit for estimating the first self-location in the real spatial on the basis of the first spatial data;
    a first spatial data unification unit for transmitting the first spatial data to the second spatial recognition device; and
    a first self-location sharing unit for transmitting the first self-location to the second spatial recognition device, and
  the second spatial recognition device comprises:
    a second spatial recognition unit for generating second spatial data by recognizing a three-dimensional shape in a real space;
    a second self-location estimating unit for estimating the second self-location in the real spatial on the basis of the second spatial data;
    a second spatial data unification unit for unifying the first spatial data and the second spatial data so as to generate unified spatial data that is expressed in the same coordinate system having the same origin; and
    a second self-location sharing unit for transmitting the second self-location in the real space that has been estimated on the basis of the unified spatial data to the first spatial recognition device, and
  the first spatial recognition device or the second spatial recognition device further comprises a self-location correcting unit, and
  the self-location correcting unit corrects the first self-location or the second self-location that has been estimated by the first self-location estimating unit or the second self-location estimating unit on the basis of location information on the first spatial recognition device or the second spatial recognition device that has been measured by a total station.

6. A spatial recognition method, comprising:
generating, by a spatial recognition device, spatial data by recognizing a three-dimensional shape in a real space;
estimating self-location in the real space on the basis of the spatial data;
unifying the spatial data and spatial data that is generated by another spatial recognition device so as to generate unified spatial data that is expressed in the same coordinate system having the same origin; and
a transmitting the self-location in the real space estimated on the basis of the unified spatial data to another spatial recognition device, where in the transmitting, the self-location is acquired from another spatial recognition device when a self-location estimating unit cannot estimate the self-location.

7. A non-transitory computer readable recording medium to store a program for allowing a computer to implement the method according to claim 6.

* * * * *